US012404999B1

(12) United States Patent
Yang

(10) Patent No.: US 12,404,999 B1
(45) Date of Patent: Sep. 2, 2025

(54) SMALL FAN LAMP

(71) Applicant: Shenzhen Nashida Technology Co., Ltd., Shenzhen (CN)

(72) Inventor: Zhihui Yang, Hubei (CN)

( * ) Notice: Subject to any disclaimer, the term of this patent is extended or adjusted under 35 U.S.C. 154(b) by 0 days.

(21) Appl. No.: 18/923,703

(22) Filed: Oct. 23, 2024

(30) Foreign Application Priority Data

Sep. 3, 2024 (CN) ......................... 202422151007.5

(51) Int. Cl.

| | |
|---|---|
| ***F21V 33/00*** | (2006.01) |
| ***F21S 6/00*** | (2006.01) |
| ***F21V 14/08*** | (2006.01) |
| ***F21V 15/02*** | (2006.01) |
| ***F21V 17/06*** | (2006.01) |
| ***F21V 17/12*** | (2006.01) |
| ***F21V 17/16*** | (2006.01) |
| ***F21V 21/088*** | (2006.01) |
| ***F21V 23/00*** | (2015.01) |
| *F21Y 105/18* | (2016.01) |

(52) U.S. Cl.

CPC .......... *F21V 33/0096* (2013.01); *F21S 6/002* (2013.01); *F21V 14/08* (2013.01); *F21V 15/02* (2013.01); *F21V 17/06* (2013.01); *F21V 17/12* (2013.01); *F21V 17/164* (2013.01); *F21V 21/088* (2013.01); *F21V 23/002* (2013.01); *F21V 23/008* (2013.01); *F21Y 2105/18* (2016.08)

(58) Field of Classification Search

CPC ................................................... F21V 33/0096

See application file for complete search history.

(56) References Cited

U.S. PATENT DOCUMENTS 2,458,967 A * 1/1949 Wiedenhoeft ........... F16C 11/10 248/283.1
2016/0215782 A1* 7/2016 Xie ........................... F04F 5/46
2016/0363313 A1* 12/2016 Wang .................. F21V 19/0055

FOREIGN PATENT DOCUMENTS

CN 104265658 A * 1/2015 ............. F04D 25/08
CN 106286348 A * 1/2017 .......... F21V 33/0096
CN 107143510 A * 9/2017 ........... F04D 29/002
CN 111852916 A * 10/2020 .......... F21V 33/0096
KR 10-2011-0008646 * 7/2009 ............ F21V 21/088
KR 20240130444 A * 2/2023 .............. F21V 15/01
TW M550419 * 10/2017 ............... G06F 1/20

OTHER PUBLICATIONS

KR-20110008646 English Machine Translation provided by ESPACENET (Year: 2011).*

* cited by examiner

*Primary Examiner* — Zheng Song

(57) ABSTRACT

A small fan lamp includes a fan lamp main body and a connecting member. The fan lamp main body includes a mounting seat, a lamp group, a fan component, and a movable and adjustable connecting rod. The fan component and the lamp group are both arranged on the mounting seat, and the fan component is installed in a middle portion of the mounting seat. The lamp group is arranged around the fan component. One end of the connecting rod is connected to a middle position of a back surface of the mounting seat, and an opposite end of the connecting rod is connected to the connecting member. The connecting member is used for installing the fan lamp main body on a platform. The fan lamp main body can be installed on a desktop/a pet or plant breeding device and other carriers through the connecting member.

14 Claims, 10 Drawing Sheets

—6/10—

SMALL FAN LAMP

CROSS-REFERENCE TO RELATED APPLICATIONS

The application claims priority of Chinese patent application 2024221510075, filed on Sep. 3, 2024, which is incorporated herein by reference in its entireties.

TECHNICAL FIELD

The present invention relates to a small fan lamp applied in the technical field of plant cultivation.

BACKGROUND ART

Every time a cupboard and a shoe cabinet are opened, there is a strange odor that is difficult to dissipate, dim lighting makes it difficult to see the items inside the cupboard and the shoe cabinet, and the items stored for a long time are moldy, etc., causing inconvenience to users. When planting and maintaining plants at home, it is necessary to turn on a plant lamp for light supplement and at the same time put a fan nearby for ventilation, which is very troublesome. Meanwhile, in the design of LED lighting products, there is a constant contradiction between high-power heat dissipation design and cost-effectiveness issues.

SUMMARY

In the prior art, when planting and maintaining plants, it is very troublesome to turn on a plant lamp for light supplement while also placing a fan nearby for ventilation, and a shoe cabinet lacks lighting and ventilation. In order to solve the above-mentioned problems, a small fan lamp is provided in the present invention. A small fan lamp main body is arranged on a connecting member, and the fan lamp main body can be installed on a desktop/a pet or plant breeding device and other carriers through the connecting member, so as to facilitate a user to use anywhere. The small fan lamp main body includes an adjustable connecting rod, a fan component and a lamp group. The fan component and the lamp group are arranged on an identical mounting seat. The lamp group is arranged around the fan component, which can provide both lighting and ventilation. The structure is compact and simple, and the arrangement is reasonable, making it easy for the user to use.

The technical solution adopted by the present invention to solve its technical problem is as follows. A small fan lamp is provided in the present invention. The fan lamp includes a fan lamp main body and a connecting member. The fan lamp main body includes a mounting seat, a lamp group, a fan component, and a movable and adjustable connecting rod. The fan component and the lamp group are both arranged on the mounting seat, and the fan component is arranged in a middle portion of the mounting seat. The lamp group is arranged around the fan component. One end of the connecting rod is connected to a middle position of a back surface of the mounting seat, and an opposite end of the connecting rod is connected to the connecting member. The connecting member is used for installing the fan lamp main body on a platform.

Furthermore, the mounting seat is in a circular shape, and the lamp group is arranged near a circular side edge of the mounting seat.

Furthermore, the mounting seat is made of aluminum alloy material.

Furthermore, the mounting seat includes a transparent cover and a supporting base. The supporting base is made of aluminum alloy material. A first mounting slot is defined in a middle of the supporting base for installing the fan component, and a second mounting slot is defined in an inner side edge of the supporting base for installing the lamp group. The transparent cover is installed on the supporting base and covers the lamp group and the fan component. One end of the connecting rod is connected to a central position of a back portion of the supporting base.

Furthermore, the supporting base includes one annular supporting plate, a plurality of first connecting ribs, one connecting seat and a blocking plate. The plurality of first connecting ribs are evenly spaced around the annular supporting plate. One end of the first connecting rib is connected to a bottom portion of the annular supporting plate, and an opposite end of the first connecting rib is connected to an outer side of the connecting seat. The connecting seat is disposed on a central axis of the annular supporting plate. The first connecting rib includes a first connecting section and a second connecting section. The first connecting section is connected to the second connecting section, and a transitional bend is formed at a connection between the first connecting section and the second connecting section, so that the annular supporting plate, the first connecting rib, and the connecting seat are connected to form a step shape and form the second mounting slot. The blocking plate is arranged around an outer side surface of the annular supporting plate, so that the supporting plate and the blocking plate form the first mounting slot. The connecting rod is connected to the connecting seat.

Furthermore, the transparent cover includes a circular transparent cover plate, a first connecting cylinder, and a plurality of second connecting ribs. One end of the plurality of second connecting ribs is connected to a center of the transparent cover plate, and an opposite end of the plurality of second connecting ribs is connected to the transparent cover plate. The plurality of second connecting ribs are evenly spaced apart from each other, so that the transparent cover plate and the plurality of second connecting ribs form a fan cover that covers the fan component. The transparent cover plate covers the lamp group. One end of the first connecting cylinder is connected to an inner ring side wall of the transparent cover plate, and the first connecting cylinder is integrally formed with the transparent cover plate. A first thread is provided on an outer side wall of the first connecting cylinder, and a second thread is provided on an inner side edge of the first connecting rib. The first connecting cylinder is installed in the first mounting slot, and the fan component is positioned in the first connecting cylinder. The first connecting cylinder is fixed to the mounting seat through connection of the first thread and the second thread.

Furthermore, the lamp group includes a lamp plate and a plurality of light emitting units. The plurality of light emitting units are arranged on the lamp plate, and the lamp plate is installed in the second mounting slot. An opening is defined in the lamp plate, and a bottom wall of the second mounting slot is provided with a fixing column. When the lamp plate is installed in the second mounting slot, the fixing column is positioned in the opening.

Furthermore, the connecting seat includes a base, a cover shell, and a second connecting cylinder. The base is arranged on the central axis of the annular supporting plate, the first connecting rib is connected to the base, and the first connecting rib is integrally formed with the base. An outer side surface of the base is provided with a third mounting slot, and a plurality of first passing holes are defined between a bottom wall and a side wall of the third mounting slot. The cover shell is arranged in a cone shape, and a second passing hole is defined in a bottom portion of the cover shell. The second connecting cylinder is installed in the second passing hole, and one end of the connecting rod is installed in the second connecting cylinder. A plurality of elastic plates with elasticity is provided on an inner side of the cover shell, and the plurality of elastic plates are arranged corresponding to a total number of the first passing holes. One end of the elastic plate away from the cover shell is provided with a protrusion. When the cover shell is installed on the base, the protrusion is placed in the first passing hole, and the cover shell covers the third mounting slot.

Furthermore, insertion rods are provided on the base, and insertion columns are provided on the cover shell at positions corresponding to the insertion rods. The insertion rods are capable of being inserted into the insertion columns.

Furthermore, the connecting member is a tripod or a clamp.

Furthermore, when the connecting member is a clamp, the clamp includes an upper clamp piece, a lower clamp piece, and an elastic member. The elastic member is disposed between the upper clamp piece and the lower clamp piece. The elastic member applies an elastic force to the upper clamp piece and the lower clamp piece, so that a clamp head of the upper clamp piece and a clamp head of the lower clamp piece have a movement tendency to interlock with each other.

Furthermore, a total number of the fan lamp main bodies is more than one, and the fan lamp main bodies are all mounted on the clamp.

Furthermore, when the connecting member is a clamp, the clamp includes a U-shaped mounting plate, a bolt, and a nut. The U-shaped mounting plate is provided with a mounting hole for the bolt to pass through. After the bolt passes through the mounting hole, the nut can be installed on the bolt.

Furthermore, one end of the U-shaped mounting plate is arranged in a cone shape.

Furthermore, the fan lamp further includes a controller. The controller is used for controlling the lamp group and the fan component.

Furthermore, the fan lamp further includes a controller, and the connecting rod is a hollow hose. The controller is used for controlling the lamp group and the fan component. The controller is positioned near the connecting member, and the controller is connected to the fan component and the lamp group through a wire. The wire passes through the hollow hose.

Beneficial effects of the present invention are as follows. The small fan lamp is provided in the present invention. The small fan lamp main body is arranged on the connecting member. The fan lamp main body can be installed in a shoe cabinet or installed on a flower pot through the connecting member, so as to facilitate the user to use anywhere. The small fan lamp main body includes the adjustable connecting rod, the fan component and the lamp group. The fan component and the lamp group are arranged on the same mounting seat. The structure is simple and the arrangement is reasonable, making it easy for the user to use. The annular supporting plate, the connecting rib, and the connecting seat are connected to form a step shape, so that the entire mounting seat and the connecting rod can be in a "sunflower" shape after being connected, allowing the small fan lamp to be integrated with the plant when installed on the flower pot. The supporting base is made of aluminum alloy, and the use of aluminum alloy can meet the better heat dissipation of the lamp group. Therefore, when the power used by the lamp is too high, the lamp group is not easily burned out, which increases the service life of the fan lamp.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
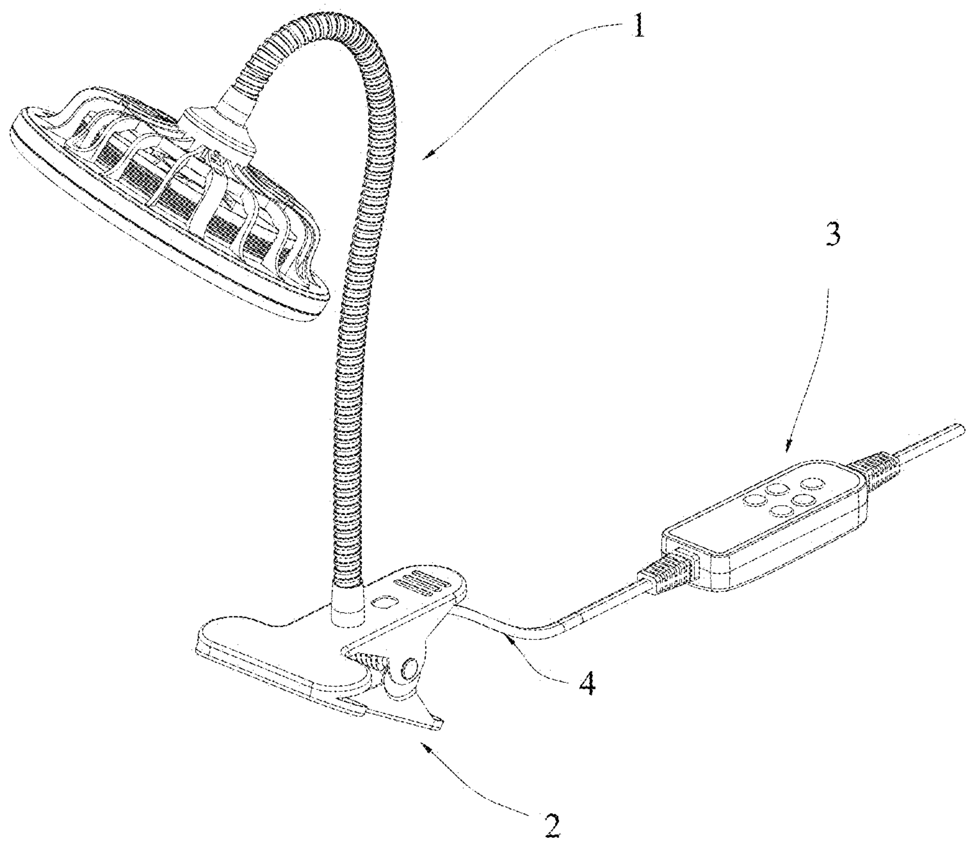
FIG. 1 is a front perspective view of a fan lamp with clamp structure one according to the present invention.
Figure 2:
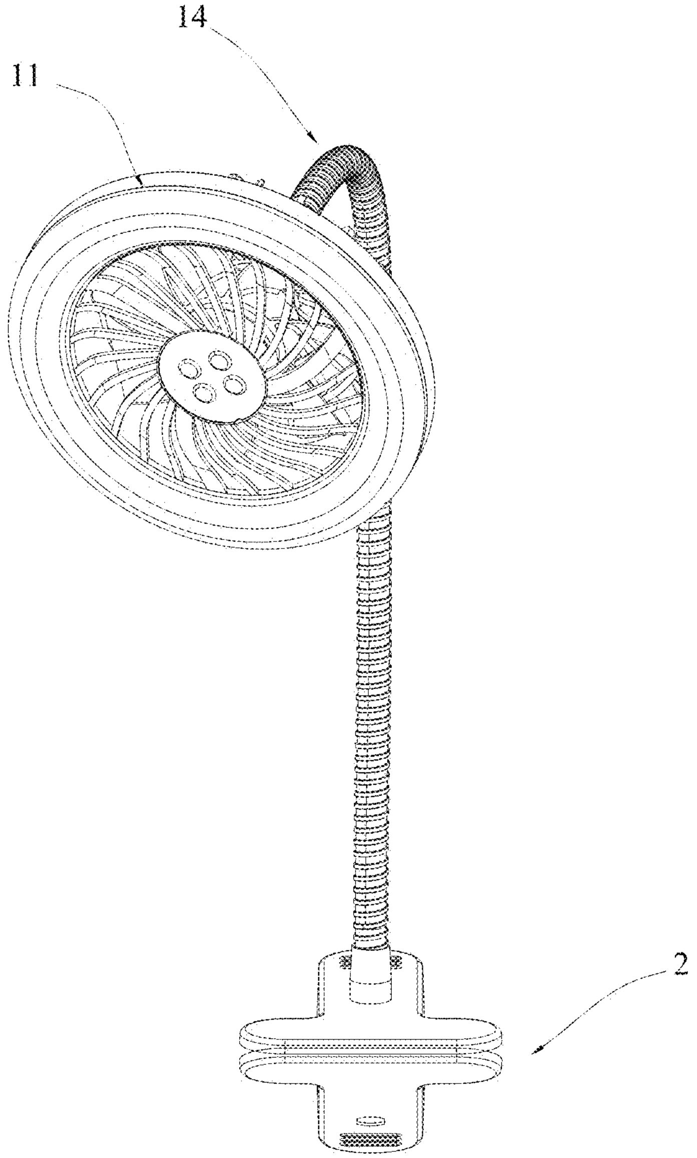
FIG. 2 is a rear perspective view of a fan lamp with clamp structure one according to the present invention.

Reference numerals: fan lamp main body 1; mounting seat 11; transparent cover 111; transparent cover plate 1111; first connecting cylinder 1112; second connecting rib 1113; first thread 1114; second thread 1115; supporting base 112; first mounting slot 101; second mounting slot 102; fixing column 1021; lamp group 12; annular supporting plate 121; first connecting rib 122; first connecting section 1221; second connecting section 1222; transitional bend 1223; connecting seat 123; base 1231; cover shell 1232; second connecting cylinder 1233; third mounting slot 1234; first passing hole 1235; second passing hole 1236; elastic plate 1237; protrusion 1238; insertion rod 1239; insertion column 1240; fan component 13; fan cover 130; blocking plate 124; connecting rod 14; connecting member 2; lamp plate 21; opening 210; upper clamp piece 211; lower clamp piece 212; elastic member 213; light emitting unit 22; U-shaped mounting plate 221; mounting hole 2211; bolt 222; nut 223; controller 3.

DETAILED DESCRIPTION OF THE EMBODIMENTS

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term “comprising” when utilized, means “including, but not necessarily limited to”; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to “an” or “one” embodiment in this disclosure are not necessarily to the same embodiment, and such references can mean “at least one”. In addition, the terms “first” and “second” are used for descriptive purposes only and cannot be understood as indicating or implying relative importance or implying the number of indicated technical features. Thus, the features defined as “first” and “second” may explicitly or implicitly include one or more of the features. In the description of embodiments of the application, “a plurality of” means two or more, unless otherwise specifically defined.

Referring to FIGS. 1-11, a small fan lamp is provided in the present invention. The fan lamp includes a fan lamp main body 1 and a connecting member 2. The connecting member is mainly used for installing the fan lamp main body on a platform, such as a plant pot, a placement platform of a shoe cabinet, or a desktop, all of which are acceptable. The connecting member can be a clamp, an installation bracket, a screw hole, or a flexible connecting member made of iron wire that can be installed on the platform, etc., which can be set according to a specific user's usage habits. In this embodiment, a clamp and a tripod are mainly preferred, so that the user can quickly install the fan lamp main body on the platform, facilitating the user's use. The fan lamp main body 1 includes a mounting seat 11, a lamp group 12, a fan component 13, and an adjustable connecting rod 14. The mounting seat 11 is in a circular shape. The lamp group 12 is arranged along a circular side edge of the mounting seat 11, and the fan component 13 is arranged in a middle portion of the mounting seat 11. One end of the connecting rod 14 is connected to a middle position of a back surface of the mounting seat 11, and an opposite end of the connecting rod 14 is connected to the connecting member 2. The connecting rod can be fixedly arranged on the connecting member, and can also be detachably connected to the connecting member. In this embodiment, it is preferred that the connecting rod is detachably connected to the connecting member, so that the fan lamp can use an identical fan lamp main body and replace different connecting members according to the environment, which is also convenient for user to use. Moreover, the mounting seat 11 is in a circular shape, and the lamp group is arranged around an outer edge of the mounting seat 11, which expands a light range of the lamp and makes an overall appearance of the small fan lamp more beautiful. One end of the connecting rod 14 is connected to the middle position of the back surface of the mounting seat 11, which provides greater stability and facilitates the adjustment of the mounting seat 11 in all directions. The above-mentioned connecting rod can be an adjustable and supportive hose, a supportive and adjustable rod similar to a “telephone line”, or a telescopic rod, but in either case, a middle part is hollow for easy wiring of a wire. In this embodiment, it is preferred to use the adjustable and supportive hose, so that the user can adjust a fan head at various angles, that is, the fan head can be adjusted in universal directions as Cardan joint, the wire can also be prevented from being exposed, and the cost is relatively low. That is to say, the fan lamp main body is arranged on the connecting member, and the connecting member 2 is used for installing the fan lamp main body 1 on a platform. The platform can be a flower pot, a shoe cabinet, a desktop, a bedside, etc., but the main application is on plants. Through lighting and ventilation, plants can grow faster. The fan lamp main body can be installed in the shoe cabinet or on the flower pot through the connecting member, making it convenient for the user to use anywhere. The fan lamp main body includes the adjustable connecting rod, the fan component and the lamp group. The fan component and the lamp group are arranged on an identical mounting seat. The structure is simple and the arrangement is reasonable, making it easy for the user to use.

In this embodiment, the fan lamp further includes a control panel. The control panel is positioned in a middle portion of a front surface of the mounting seat 11, which is more space-saving, more convenient to operate, and easy for the user to adjust and control the small fan lamp. However, control panels of most lamps or fans in the prior art are positioned on back surfaces, which is inconvenient for the user to observe brightness and temperature of the lamps or a rotating speed of the fans. In this embodiment, the control panel is positioned in the middle portion of the front surface of the mounting seat 11, making it easier for the user to observe the lamp and the fan during adjustment so as to adjust them to an appropriate range.

In this embodiment, the above-mentioned lamp group has a plurality of modes. Due to different usage environments, the user can adjust the lamp group through the control panel. If the small fan lamp is used for lighting plants and making the plants grow faster, it can be adjusted to a light mode that helps plants growth. If the small fan lamp is used in a shoe cabinet, the light can be adjusted to normal light. Therefore, the user can adjust the lamp group according to different usage environments.

In this embodiment, the mounting seat 11 includes a transparent cover 111 and a supporting base 112. A first mounting slot 101 is defined in a middle of the supporting base 112 for installing the fan component 13, and a second mounting slot 102 is defined in an inner side edge of the supporting base 112 for installing the lamp group 12. The transparent cover 111 is installed on the supporting base 112 and covers the lamp group 12 and the fan component 13. One end of the connecting rod 14 is connected to a central position of a back portion of the supporting base 112, and the control panel is arranged at a central position of the transparent cover 111. The above structural arrangement is simple and reasonable, which is convenient for the user to use.

In this embodiment, the supporting base 112 is made of aluminum alloy material, and the use of aluminum alloy material enables better heat dissipation of the lamp group. Therefore, when power used by the lamp is too high, the lamp group is not easily burned out, which extends the service life of the fan lamp.

Figure 4:
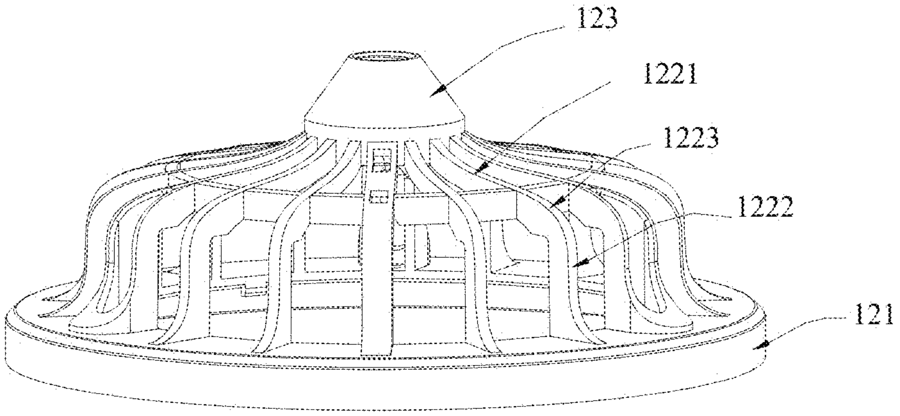
FIG. 4 is a perspective view of a supporting base according to the present invention.
Figure 5:
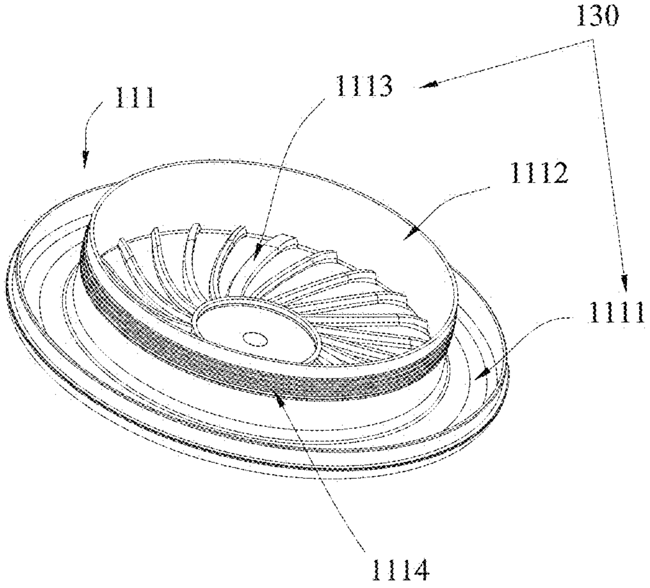
FIG. 5 is a perspective view of a transparent cover according to the present invention.
Figure 6:
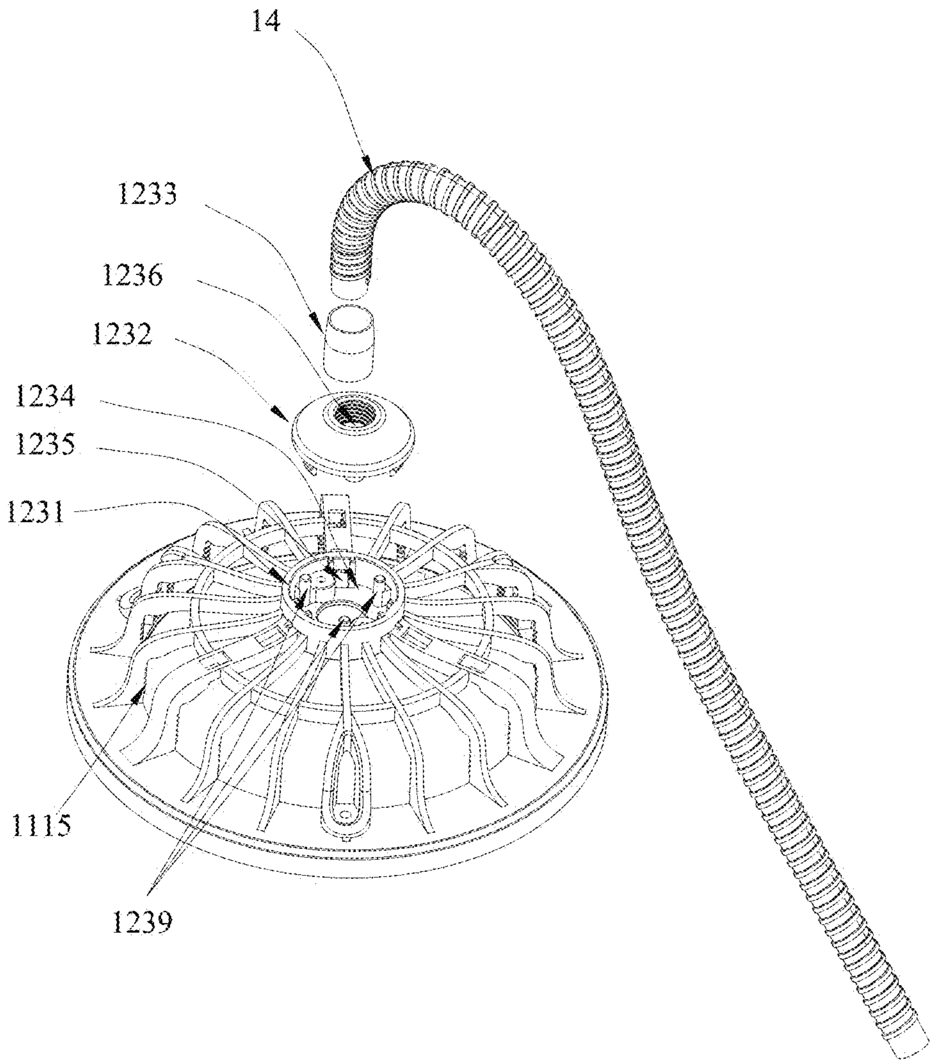
FIG. 6 is a structural diagram of a connecting seat, a supporting base, and a mounting seat according to the present invention.
Figure 7:
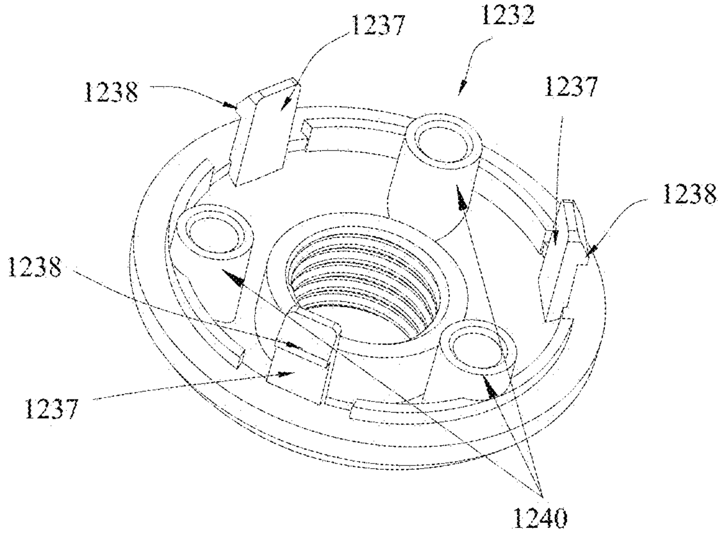
FIG. 7 is a perspective view of a cover shell according to the present invention.

In this embodiment, the supporting base 112 includes one annular supporting plate 121, a plurality of first connecting ribs 122, one connecting seat 123 and a blocking plate 124. The plurality of first connecting ribs 122 are evenly spaced around the annular supporting plate 121. One end of the first connecting rib 122 is connected to a bottom portion of the annular supporting plate 121, and an opposite end of the first connecting rib 122 is connected to an outer side of the connecting seat 123. The connecting seat 123 is disposed on a central axis of the annular supporting plate 121. The first connecting rib 122 includes a first connecting section 1221 and a second connecting section 1222. The first connecting section 1221 is connected to the second connecting section 1222, and a transitional bend 1223 is formed at a connection between the first connecting section 1221 and the second connecting section 1222, as shown in FIG. 4, so that the annular supporting plate 121, the first connecting rib 122, and the connecting seat 123 are connected to form a step shape and form the second mounting slot 102. The blocking plate 124 is arranged around an outer side surface of the annular supporting plate 121, so that the supporting plate 121 and the blocking plate 124 form the first mounting slot 101. The connecting rod 14 is connected to the connecting seat 123. The above structure makes the fan lamp main body more like a "sunflower" as a whole. "Sunflower" has a good meaning and impression in daily life. Therefore, in terms of the overall fan lamp main body being more like a "sunflower", firstly, the user is provided with a good impression and experience; secondly, when the fan lamp is used on plants, the fan lamp is made more integrated with the plants, without any discordance like ordinary lamps, increasing the user experience.

In this embodiment, the transparent cover 111 includes a circular transparent cover plate 1111, a first connecting cylinder 1112, and a plurality of second connecting ribs 1113. One end of the plurality of second connecting ribs 1113 is connected to a center of the transparent cover plate 1111, and an opposite end of the plurality of second connecting ribs 1113 is connected to the transparent cover plate 1111. The plurality of second connecting ribs 1113 are evenly spaced apart from each other, so that the transparent cover plate 1111 and the plurality of second connecting ribs 1113 form a fan cover 130 that covers the fan component 13. The transparent cover plate 1111 covers the lamp group 12. One end of the first connecting cylinder 1112 is connected to an inner ring side wall of the transparent cover plate 1111, and the first connecting cylinder 1112 is integrally formed with the transparent cover plate 1111. A first thread 1114 is provided on an outer side wall of the first connecting cylinder 1112, and a second thread 1115 is provided on an inner side edge of the first connecting rib 122. The first connecting cylinder 1112 is installed in the first mounting slot 101, and the fan component 13 is positioned in the first connecting cylinder 1112. The first connecting cylinder 1112 is fixed to the mounting seat 11 through connection of the first thread 1114 and the second thread 1115. This structure is more convenient for the installation of the fan and the lamp group. Moreover, the transparent cover plate 1111, the first connecting cylinder 1112, and the plurality of second connecting ribs 1113 are integrally formed, thereby reducing parts, reducing the assembly process, and improving the assembly efficiency.

In this embodiment, the lamp group 12 includes a lamp plate 21 and a plurality of light emitting units 22. The plurality of light emitting units 22 are arranged on the lamp plate 21, and the lamp plate 21 is installed in the second mounting slot 102. An opening 210 is defined in the lamp plate 21, and a bottom wall of the second mounting slot 102 is provided with a fixing column 1021. When the lamp plate 21 is installed in the second mounting slot 102, the fixing column 1021 is positioned in the opening 210. The combination of the fixing column 1021 and the opening plays a limiting or fixing role. The main purpose of this structure is that when assembling other parts, the lamp plate will not move when mounted, ensuring sufficient stability and facilitating the assembly of subsequent parts.

In this embodiment, the connecting seat 123 includes a base 1231, a cover shell 1232, and a second connecting cylinder 1233. The base 1231 is arranged on the central axis of the annular supporting plate 121, the first connecting rib 122 is connected to the base 1231, and the first connecting rib 122 is integrally formed with the base 1231. An outer side surface of the base 1231 is provided with a third mounting slot 1234, and a plurality of first passing holes 1235 are defined between a bottom wall and a side wall of the third mounting slot 1234. The cover shell 1232 is arranged in a cone shape, and a second passing hole 1236 is defined in a bottom portion of the cover shell 1232. The second connecting cylinder 1233 is installed in the second passing hole 1236, and one end of the connecting rod 14 is installed in the second connecting cylinder 1233. A plurality of elastic plates 1237 with elasticity is provided on an inner side of the cover shell 1232, and the plurality of elastic plates 1237 are arranged corresponding to a total number of the first passing holes 1235. One end of the elastic plate 1237 away from the cover shell 1232 is provided with a protrusion 1238. When the cover shell 1232 is installed on the base 1231, the protrusion 1238 is placed in the first passing hole 1235, and the cover shell 1232 covers the third mounting slot 1234. This structure allows the cover shell 1232 to be quickly assembled onto the base 1231. The base 1231 and the supporting base 112 are integrally formed, simplifying the assembly, without a need to use bolts, screws and other parts, which can improve assembly efficiency.

In this embodiment, insertion rods 1239 are provided on the base 1231, and insertion columns 1240 are provided on the cover shell 1232 at positions corresponding to the insertion rods 1239. The insertion rods 1239 are capable of being inserted into the insertion columns 1240, further making the base 1231 and the cover shell 1232 more stable, and making the assembly efficiency higher. The insertion rod 1239 and the insertion column 1240 have a certain assembly guiding effect, and the insertion rod 1239 and the insertion column 1240 further reinforce the elastic plate 1237, so that the elastic plate can be prevented from being easily damaged when assembled improperly.

Figure 3:
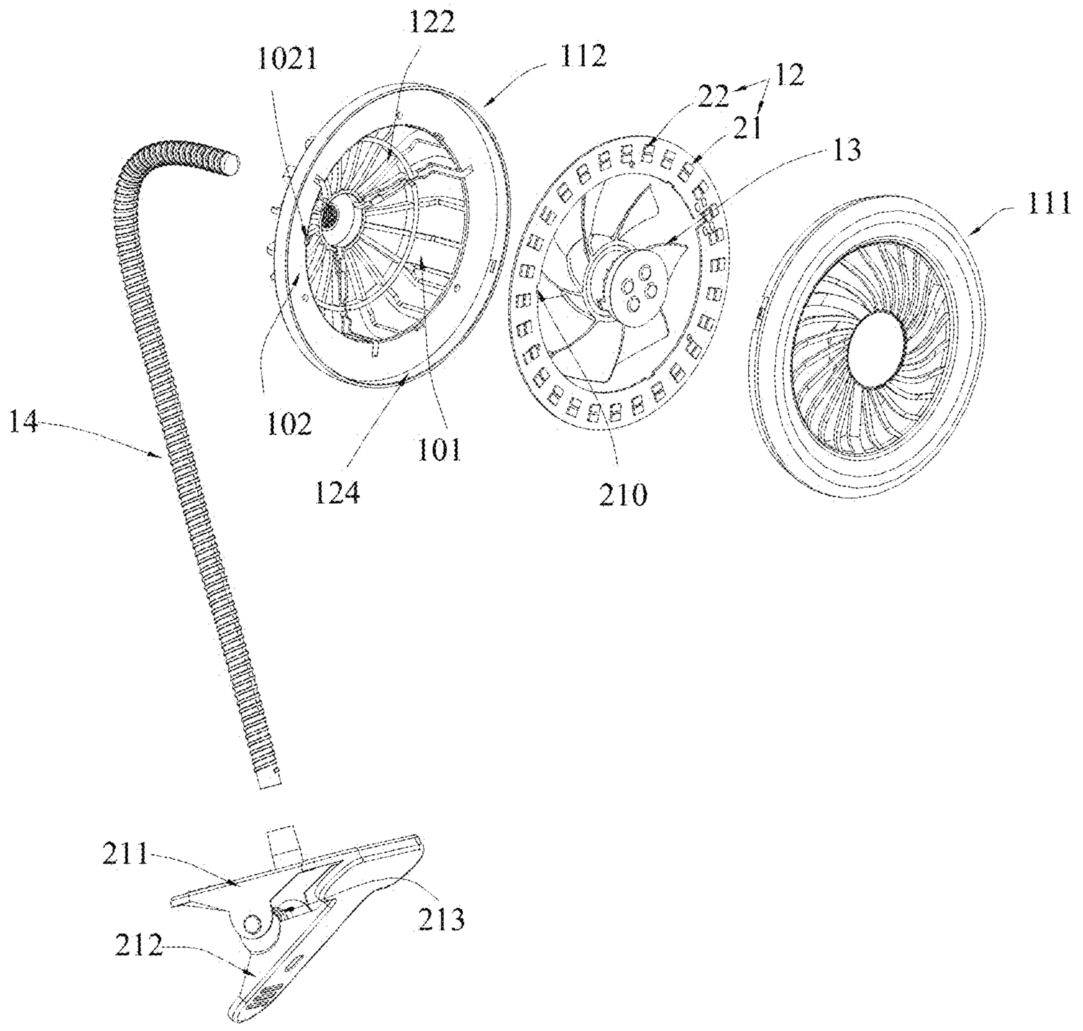
FIG. 3 is an exploded view of a fan lamp with clamp structure one according to the present invention.
Figure 9:
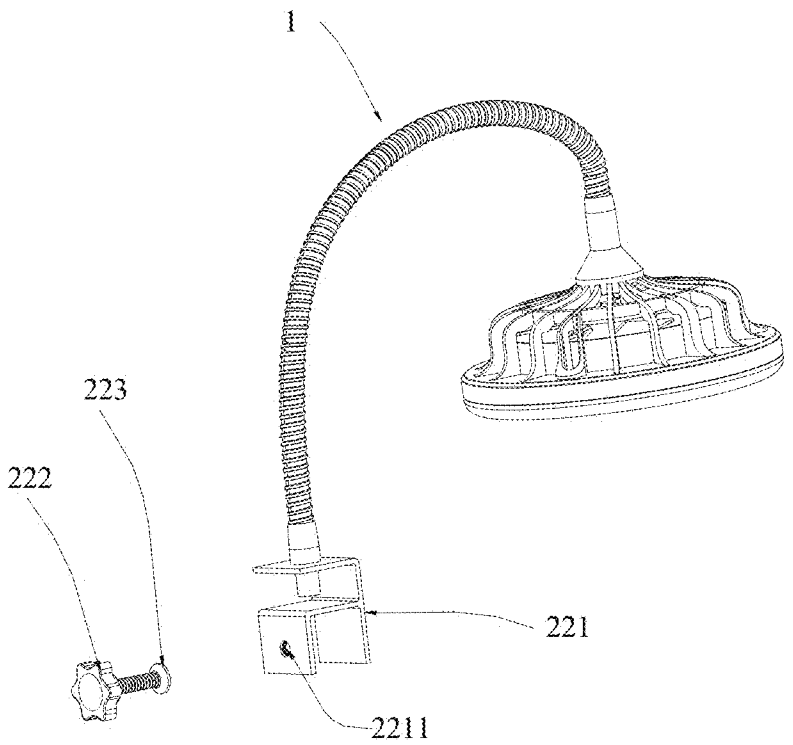
FIG. 9 is an exploded view of a fan lamp with clamp structure two according to the present invention.
Figure 10:
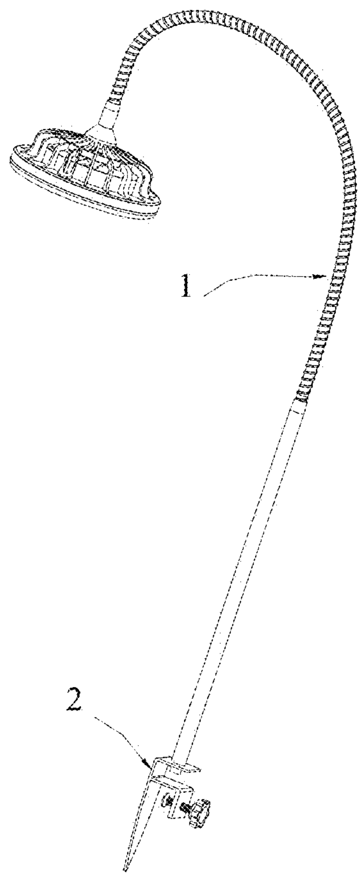
FIG. 10 is a structural diagram of another form of clamp structure two according to the present invention.
Figure 11:
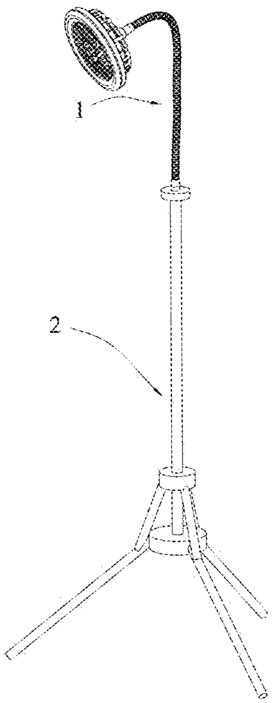
FIG. 11 is a perspective view of a fan lamp with a tripod according to the present invention.

In this embodiment, as shown in FIGS. 8-11, the connecting member 2 is a tripod or a clamp. When the connecting member is a tripod, as shown in FIG. 11, the tripod is convenient for stable placement on the ground, and the clamp is convenient for clamping on objects. Two types of clamp structures can be used, and the specific structures are as follows:

Clamp structure one: in this embodiment, when the connecting member 2 is a clamp, the clamp includes an upper clamp piece 211, a lower clamp piece 212, and an elastic member 213, as shown in FIG. 3. The elastic member 213 is disposed between the upper clamp piece 211 and the lower clamp piece 212. The elastic member 213 applies an elastic force to the upper clamp piece 211 and the lower clamp piece 212, so that a clamp head of the upper clamp piece 211 and a clamp head of the lower clamp piece 212 have a movement tendency to interlock with each other. The above structure forms a duckbill clamp, which is convenient for the user to clamp the fan lamp on objects such as flower pots, fish tanks, or brackets.

Figure 8:
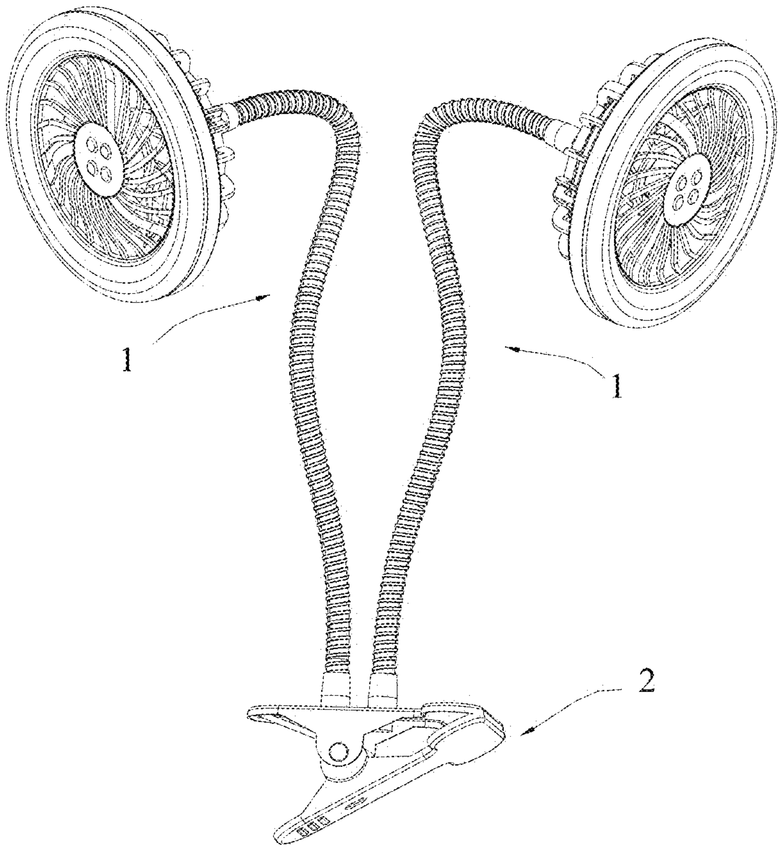
FIG. 8 is a perspective view of more than one fan lamp main body according to the present invention.

In this embodiment, a total number of the fan lamp main bodies 1 is more than one, and the fan lamp main bodies 1 are all mounted on the clamp, as shown in FIG. 8. It is preferable for the fan lamp main body 1 to be detachably mounted on the clamp, so that the user can install different numbers of the fan lamp bodies according to needs. The plurality of fan lamp bodies are mounted on an identical connecting member, thereby reducing costs, saving installation space, and facilitating the user's use.

Clamp structure two: in this embodiment, as shown in FIG. 9, when the connecting member 2 is a clamp, the clamp includes a U-shaped mounting plate 221, a bolt 222, and a nut 223. The U-shaped mounting plate 221 is provided with a mounting hole 2211 for the bolt 222 to pass through. After the bolt 222 passes through the mounting hole 2211, the nut 223 can be installed on the bolt 222. When the above duckbill clamp cannot be stably installed, this structure can be used for installation to make the fan lamp more stable.

In this embodiment, as shown in FIG. 10, one end of the U-shaped mounting plate 221 is arranged in a cone shape, and the tapered end can be inserted into the soil of the flower pot, making the fan lamp more stably installed.

In this embodiment, the fan lamp further includes a controller 3, and the connecting rod 14 is a hollow hose. The controller 3 is used for controlling the lamp group 12 and the fan component 13. The controller 3 is positioned near the connecting member 2, and the controller 3 is connected to the fan component 13 and the lamp group 12 through a wire 4. The wire 4 passes through the hollow hose, that is, the controller is disposed externally through the wire. The controller being disposed externally reduces overall manufacturing costs and also reduces transportation costs. Because if the controller is disposed on the mounting seat, a large amount of design and mold making are required, which will increase the cost. The arrangement of disposing the controller externally, with the controller being like a remote control, is a mature process on the market and has a lower cost. The controller is disposed externally so as to reduce the overall manufacturing cost. Moreover, disposing the controller externally is convenient for maintenance. If the controller is disposed on the mounting seat, too many parts need to be disassembled, which is not convenient for maintenance.

The fan lamp further includes a control circuit board, and the control circuit board is positioned inside the controller 3, which facilitates the installation and arrangement of the control circuit board, and also facilitates the maintenance of the control circuit board.

In summary, the small fan lamp in this embodiment is suitable for different scenarios, with the universal adjustable connecting rod and a variety of connection methods of the connecting member. The small fan lamp has good heat dissipation function, simple structure and reasonable design, achieving a variety of functions and being suitable for various occasions, thereby providing high cost-effectiveness. The small fan lamp is mainly used on plants, which can provide light and ventilation to help plants grow faster. In the prior art, a lamp's lighting and a fan are used separately, which not only takes up space, but also has low cost-effectiveness and also inconvenient for the user to place and use. By contrast, in this embodiment, the above methods of the connecting member are available for the user to choose from, which is more convenient for a customer to choose the connecting member according to the size and height of the plant, thereby improving the user experience as a whole.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A fan lamp, comprising a fan lamp main body and a connecting member, wherein the fan lamp main body comprises a mounting seat, a lamp group, a fan component, and a movable and adjustable connecting rod; the fan component and the lamp group are both arranged on the mounting seat, the fan component is arranged in a middle portion of the mounting seat, the lamp group is arranged around the fan component, one end of the connecting rod is connected to a middle position of a back surface of the mounting seat, an opposite end of the connecting rod is connected to the connecting member, and the connecting member is used for installing the fan lamp main body on a platform;

wherein the mounting seat comprises a transparent cover and a supporting base, the supporting base is made of aluminum alloy material, a first mounting slot is defined in a middle of the supporting base for installing the fan component, a second mounting slot is defined in an inner side edge of the supporting base for installing the lamp group, the transparent cover is installed on the supporting base and covers the lamp group and the fan component, and one end of the connecting rod is connected to a central position of a back portion of the supporting base.

2. The fan lamp according to claim 1, wherein the mounting seat is in a circular shape, and the lamp group is arranged near a circular side edge of the mounting seat.

3. The fan lamp according to claim 1, wherein the supporting base comprises one annular supporting plate, a plurality of first connecting ribs, one connecting seat and a blocking plate; the plurality of first connecting ribs are evenly spaced around the annular supporting plate, one end of the first connecting rib is connected to a bottom portion of the annular supporting plate, an opposite end of the first connecting rib is connected to an outer side of the connecting seat, and the connecting seat is disposed on a central axis of the annular supporting plate; the first connecting rib comprises a first connecting section and a second connecting section, the first connecting section is connected to the second connecting section, and a transitional bend is formed at a connection between the first connecting section and the second connecting section, so that the annular supporting plate, the first connecting rib, and the connecting seat are connected to form a step shape and form the second mounting slot; the blocking plate is arranged around an outer side surface of the annular supporting plate, so that the supporting plate and the blocking plate form the first mounting slot, and the connecting rod is connected to the connecting seat.

4. The fan lamp according to claim 3, wherein the transparent cover comprises a circular transparent cover plate, a first connecting cylinder, and a plurality of second connecting ribs; one end of the plurality of second connecting ribs is connected to a center of the transparent cover plate, an opposite end of the plurality of second connecting ribs is connected to the transparent cover plate, and the plurality of second connecting ribs are evenly spaced apart from each other, so that the transparent cover plate and the plurality of second connecting ribs form a fan cover that covers the fan component; the transparent cover plate covers the lamp group, one end of the first connecting cylinder is connected to an inner ring side wall of the transparent cover plate, the first connecting cylinder is integrally formed with the transparent cover plate, a first thread is provided on an outer side wall of the first connecting cylinder, a second thread is provided on an inner side edge of the first connecting rib, the first connecting cylinder is installed in the first mounting slot, the fan component is positioned in the first connecting cylinder, and the first connecting cylinder is fixed to the mounting seat through connection of the first thread and the second thread.

5. The fan lamp according to claim 3, wherein the lamp group comprises a lamp plate and a plurality of light emitting units, the plurality of light emitting units are arranged on the lamp plate, the lamp plate is installed in the second mounting slot, an opening is defined in the lamp plate, a bottom wall of the second mounting slot is provided with a fixing column, and when the lamp plate is installed in the second mounting slot, the fixing column is positioned in the opening.

6. The fan lamp according to claim 3, wherein the connecting seat comprises a base, a cover shell, and a second connecting cylinder; the base is arranged on the central axis of the annular supporting plate, the first connecting rib is connected to the base, and the first connecting rib is integrally formed with the base; an outer side surface of the base is provided with a third mounting slot, a plurality of first passing holes are defined between a bottom wall and a side wall of the third mounting slot, the cover shell is arranged in a cone shape, a second passing hole is defined in a bottom portion of the cover shell, the second connecting cylinder is installed in the second passing hole, and one end of the connecting rod is installed in the second connecting cylinder; a plurality of elastic plates with elasticity is provided on an inner side of the cover shell, and the plurality of elastic plates are arranged corresponding to a total number of the first passing holes; one end of the elastic plate away from the cover shell is provided with a protrusion; when the cover shell is installed on the base, the protrusion is placed in the first passing hole, and the cover shell covers the third mounting slot.

7. The fan lamp according to claim 6, wherein insertion rods are provided on the base, insertion columns are provided on the cover shell at positions corresponding to the insertion rods, and the insertion rods are capable of being inserted into the insertion columns.

8. The fan lamp according to claim 1, wherein the connecting member is a tripod or a clamp.

9. The fan lamp according to claim 8, wherein when the connecting member is a clamp, the clamp comprises an upper clamp piece, a lower clamp piece, and an elastic member; the elastic member is disposed between the upper clamp piece and the lower clamp piece, and the elastic member applies an elastic force to the upper clamp piece and the lower clamp piece, so that a clamp head of the upper clamp piece and a clamp head of the lower clamp piece have a movement tendency to interlock with each other.

10. The fan lamp according to claim 8, wherein a total number of the fan lamp main bodies is more than one, and the fan lamp main bodies are all mounted on the clamp.

11. The fan lamp according to claim 8, wherein when the connecting member is a clamp, the clamp comprises a U-shaped mounting plate, a bolt, and a nut; the U-shaped mounting plate is provided with a mounting hole for the bolt to pass through; and after the bolt passes through the mounting hole, the nut can be installed on the bolt.

12. The fan lamp according to claim 11, wherein one end of the U-shaped mounting plate is arranged in a cone shape.

13. The fan lamp according to claim 1, wherein the fan lamp further comprises a controller, the connecting rod is a hollow hose, the controller is used for controlling the lamp group and the fan component, the controller is positioned near the connecting member, the controller is connected to the fan component and the lamp group through a wire, and the wire passes through the hollow hose.

14. The fan lamp according to claim 13, wherein the fan lamp further comprises a control circuit board, and the control circuit board is positioned inside the controller.

* * * * *